(12) United States Patent
Maxwell

(10) Patent No.: US 6,363,147 B1
(45) Date of Patent: Mar. 26, 2002

(54) CAP SUPPORTED TELEPHONE HOLDER

(76) Inventor: Gary A. Maxwell, 1315 S. Puget Dr., C-38, Renton, WA (US) 98055

(*) Notice: Subject to any disclaimer, the term of this patent is extended or adjusted under 35 U.S.C. 154(b) by 0 days.

(21) Appl. No.: 09/401,560

(22) Filed: Sep. 22, 1999

(51) Int. Cl.⁷ .............................................. H04M 1/00
(52) U.S. Cl. ...................................... 379/430; 379/449
(58) Field of Search ................................ 379/430, 449, 379/446, 454, 455; 381/376, 377, 379

(56) References Cited

U.S. PATENT DOCUMENTS

| | | | | |
|---|---|---|---|---|
| 1,354,524 A | * | 10/1920 | Timmons | 379/430 |
| 2,676,213 A | * | 4/1954 | Anderson | 379/430 |
| 4,048,453 A | | 9/1977 | Seidel | 179/156 R |
| 4,367,378 A | | 1/1983 | Jordan | 179/156 R |
| 4,821,317 A | | 4/1989 | Wong | 379/430 |
| 5,233,650 A | | 8/1993 | Chan | 379/430 |
| 5,667,292 A | | 9/1997 | Sabalvaro, Jr. | 362/106 |
| 5,689,558 A | | 11/1997 | Osgood et al. | 379/430 |

* cited by examiner

*Primary Examiner*—Jack Chiang
(74) *Attorney, Agent, or Firm*—Dean A. Craine

(57) ABSTRACT

A cap supported telephone holder disclosed herein which includes an elongated body made of flexible material designed to receive a longitudinally aligned standard size cordless or cellular telephone handset. The holder includes interconnecting hook and loop connector pads disposed between the proximal end of the body and the elastic band on the cap, and an adjustable front strap attached at one end to the distal end of the body and at the opposite end to the brim of the cap. During use, the telephone is disposed in a natural, diagonal position over the ear and near and adjacent to the user's mouth. In the preferred embodiment, the distal end of the body is closed and is made of nylon mesh material. The front strap is an inverted Y-shaped strap with the two lower legs being spaced apart and attached to the pocket and the upper leg being attached to the brim of the cap. The upper leg of the front strap may be selectively attached to one of a plurality of holes formed in the brim of the cap so that the telephone mouthpiece may be properly positioned near the user's mouth.

4 Claims, 3 Drawing Sheets

CAP SUPPORTED TELEPHONE HOLDER

BACKGROUND OF THE INVENTION

1. Field of the Invention

This invention relates to holders for telephones designed to hold a telephone over a user's ear and mouth during use and, more particularly, to such a holder that attaches to a cap worn by the user.

2. Description of the Related Art

Rigid or flexible straps and headbands have been used to hold a telephone against the user's head to allow hands-free operation of the telephone. Such devices are disclosed in U.S. Pat. Nos. 5,689,558, 4,821,317, 4,367,378, and 4,048,453. In order to use the telephone, the holder must position the telephone on the head so that its ear piece and mouthpiece are positioned against or near the user's ear and mouth, respectively. One drawback with these holders in the prior art is that they are rigid structures that are uncomfortable when worn and require separate attachment of a component to the user's head.

It is fashionable today for men to wear baseball caps. Another drawback with the prior art holders mentioned above is that they cannot be used when wearing a baseball cap.

What is needed is a telephone holder that allows for hands-free operation designed to be used with a baseball cap.

SUMMARY OF THE INVENTION

It is an object of the present invention to provide a telephone holder.

It is another object of the present invention to provide a telephone holder that allows hands-free operation.

It is another object of the present invention to provide such a telephone holder that is supported by a baseball cap when worn by the user.

These and other objects of the invention are met by a cap hat supported telephone holder disclosed herein which includes an elongated body made of flexible material designed to hold a standard size cordless or cellular telephone, a proximal end cap body holding means designed to attach the proximal end of the body to the side of the elastic band on a baseball cap, and a distal end cap brim holding means designed to attach the closed distal end of the body to the brim of the baseball cap. The proximal and distal end holding means are designed to hold the handset of a telephone placed in the pocket in a diagonally aligned position against the side of the head so that the handset ear piece is positioned against the user's ear and the handset's mouthpiece is positioned near or adjacent to the user's mouth.

In the preferred embodiment, the body is made of nylon mesh material. The proximal end cap body holding means includes hook and loop connectors disposed between the proximal end of the body and the cap's elastic band. The distal end cap brim holding means includes an inverted, Y-shaped strap with the two lower legs being spaced apart and attached to the pocket and the upper leg being attached to the brim of the cap.

DESCRIPTION OF THE PREFERRED EMBODIMENT(S)

Figure 1:
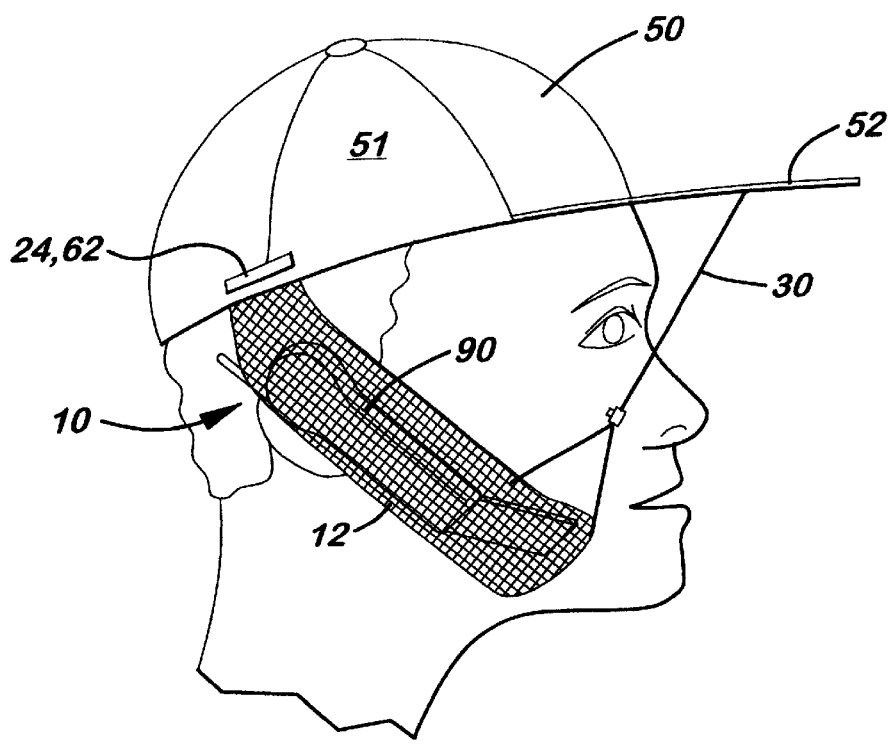
FIG. 1 is a side elevational view of a user using the cap supported telephone holder disclosed herein.
Figure 2:
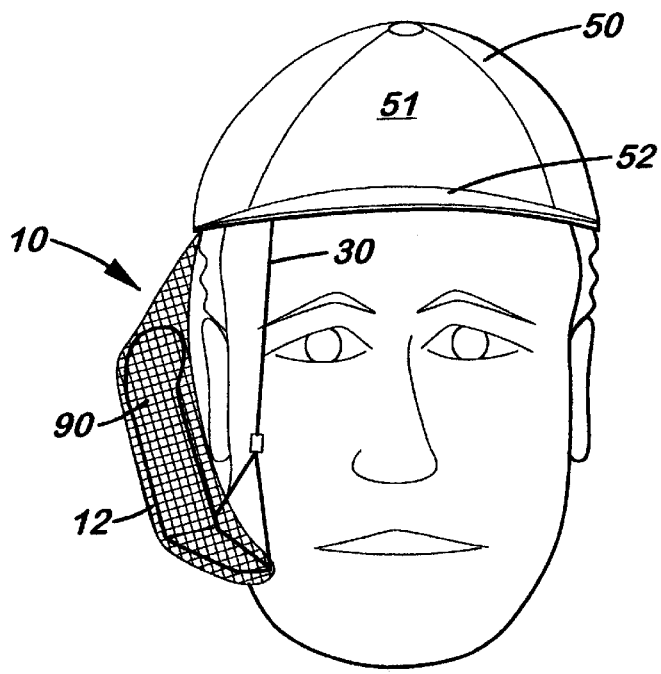
FIG. 2 is a front elevational view of the user shown in FIG. 1.
Figure 4:
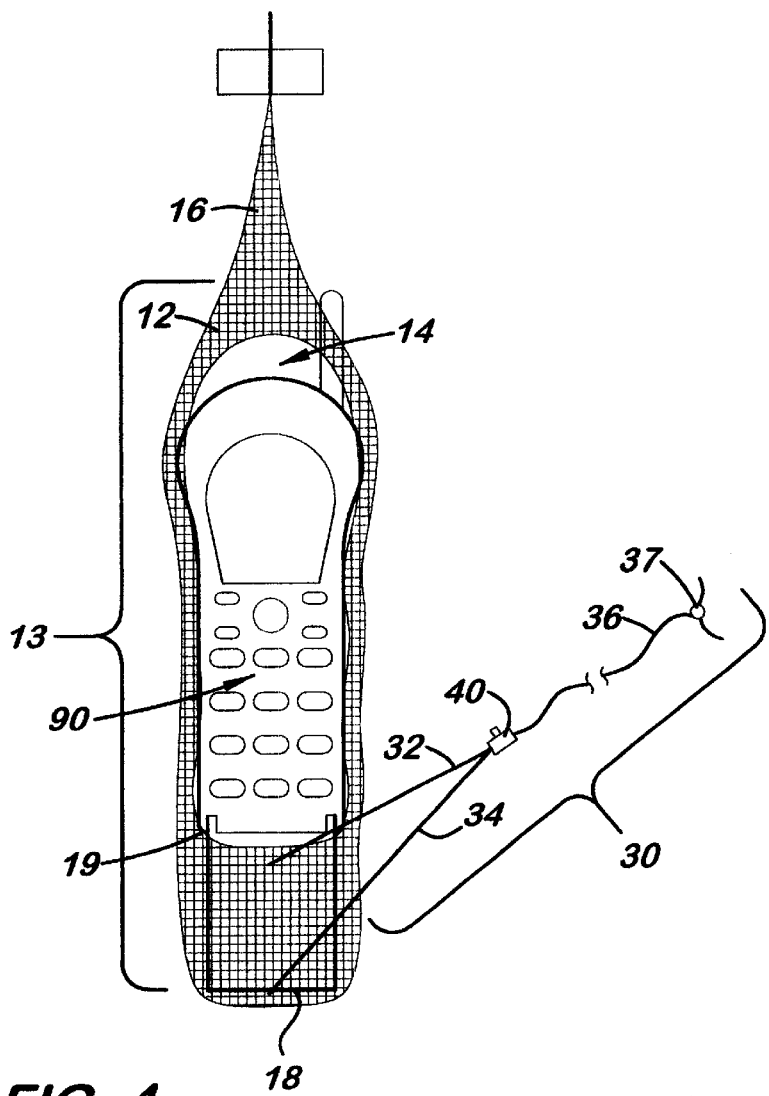
FIG. 4 is a front elevation view of the holder with a telephone placed inside the pocket.

Referring to the accompanying FIGS. 1–6, wherein like reference numbers refer to like components, a cap supported telephone holder, generally referenced as 10, is disclosed which includes an elongated body 12 made of flexible material designed to surround a standard size cordless or cellular telephone handset, generally referenced as 90. The body 12 is a tube-shaped structure with a closed distal end 18. The opposite proximal end 16 of the body 12 may be opened or closed. Formed on one side of the body 12 is a front opening 14 thereby enabling a handset 90 to be placed longitudinally inside the body 12. Attached around the opening 14 is an optional elastic strap 19 which enables the opening 14 to be selectively opened and closed when the handset 90 is placed within or removed from the body 12.

Figure 6:
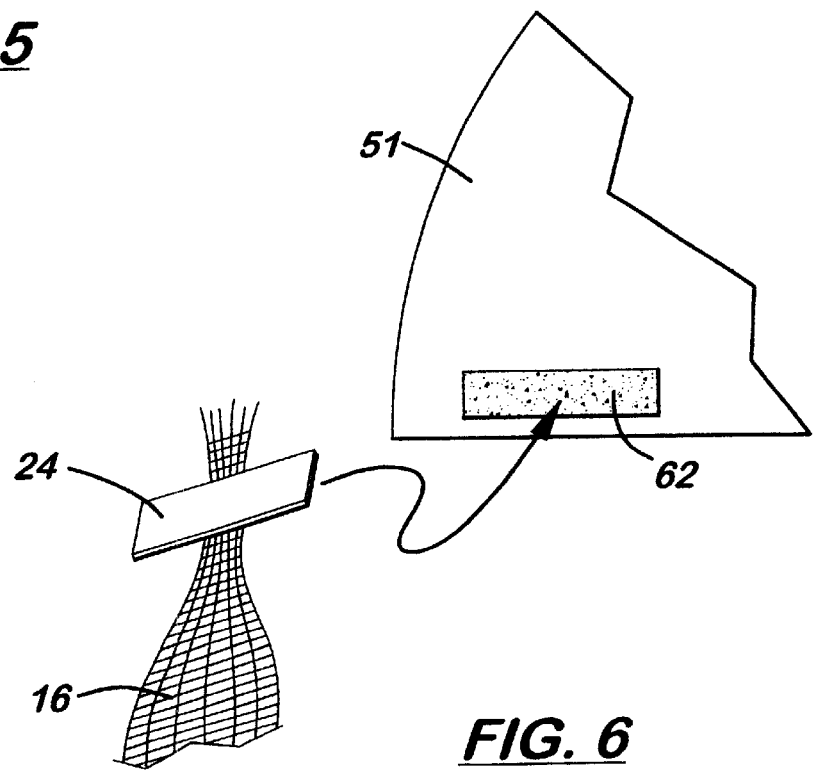
FIG. 6 is a partial side elevational view showing the hook connector pad placed on the end of the sleeve being attached to the loop connector pad attached to the edge of the cap.

Attached to the proximal end 16 of the body 12 is a hook connector pad 24. As shown in FIGS. 1 and 6, the hook connector pad 24 is selectively attached during use to a loop connector pad 62 that is adhesively attached to the cap body 51. In the preferred embodiment, the loop connector pad 62 is located parallel to the lower edge of the cap body The loop connector pad 62 is approximately three inches in length thereby enabling the proximal end 16 of the body 12 to be attached at different locations to the cap body 51. As briefly mentioned above, the distal end 18 of the body 12 is closed so that a handset 90 may be held inside the body 12. Attached to the front surface 13 of the body 12 near the distal end 18 is an adjustable strap 30. In the preferred embodiment, the adjustable strap 30 is an inverted, Y-shaped strap including two lower legs 32 and 34 and an upper leg 36. The ends of the lower legs 32 and 34 are tied or directly connected to the front surface 13 of the body 12. Disposed between the lower legs 32 and 34 and the upper leg 36 is a slide connector 40 that enables the length of the upper leg 36 to be adjusted. By adjusting the length of the upper leg 36, the relative position of the distal end 18 of the body 12 may be adjusted so that the mouthpiece on the handset 90 is placed near the user's mouth.

Figure 3:
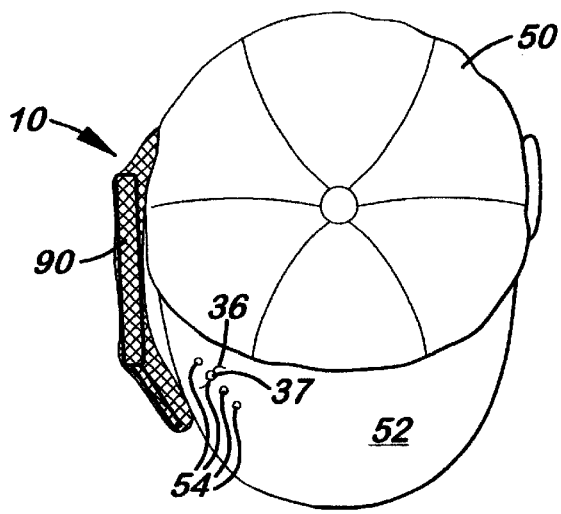
FIG. 3 is a top plan view of the user shown in FIGS. 1 and 2.
Figure 5:
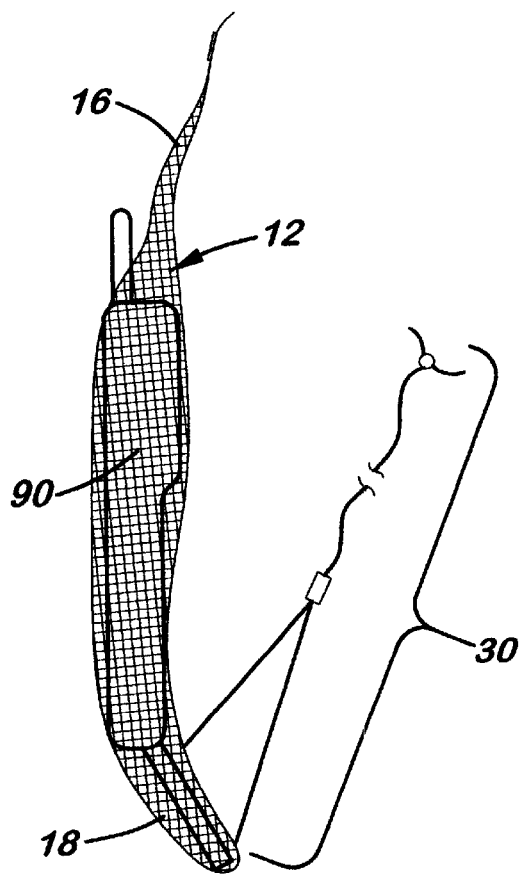
FIG. 5 is a left side elevational view of the holder shown in FIG. 4.

As shown in FIG. 3, the upper end 37 of the upper leg 36 is inserted through one of a plurality of holes 54 formed on the brim 52 of the cap 50. A knot 37 is formed on the upper end of the upper leg 36 to prevent it from disengaging from the hole 54. In the preferred embodiment, the holes 54 are spaced apart and aligned forward and diagonally on the brim 52 so that the proximal end of the body 12 may be pulled forward and medially towards the user's mouth.

In the preferred embodiment, the body 12 is made of nylon mesh material with individual cells measuring ⅛ inch to 3/16 inch wide. The adjustable strap 30 is also made of nylon and measures approximately ten inches in length.

In compliance with the statute, the invention described herein has been described in language more or less specific as to structural features. It should be understood, however, that the invention is not limited to the specific features shown, since the means and construction shown, comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A cap supported telephone holder, comprising:
 a. an elongated body used to hold the handset of a telephone, having opposite distal and proximal ends, said body being made of mesh and having a closed distal end and a side opening enabling a handset to be longitudinally aligned therein;
 b. a proximal end cap body attachment means for selectively attaching said proximal end of said body to the side of a cap;
 c. an adjustable strap selectively attached between said distal end of said body and the brim of a cap.

2. A cap supported telephone holder, as recited in claim 1, wherein said proximal end cap body attachment means are hook and loop connector pads disposed between the cap and said body.

3. A cap supported telephone holder, as recited in claim 1, further including at least one hole formed on said brim of the cap to enable the end of said adjustment strap to be inserted there through.

4. A cap supported telephone holder, as recited in claim 3, further including a plurality of holes forward and diagonally aligned on the brim of a cap.

* * * * *